of said shank, bending the said eyes at one end of said shank outwardly away from each other and then inwardly toward each other to form a head, and bending the eyes at the opposite end of said shank in opposite directions and at substantially right angles to the said shank to form a base.

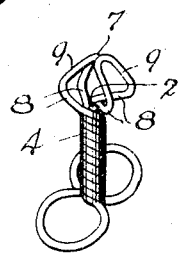
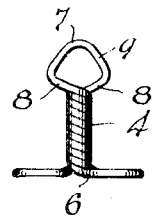
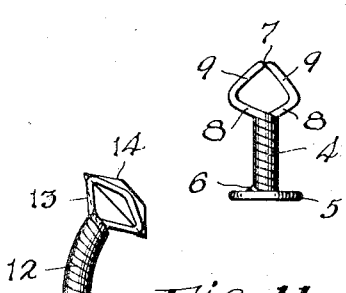
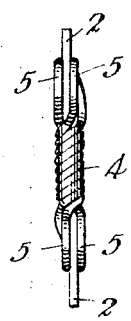
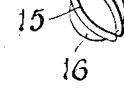
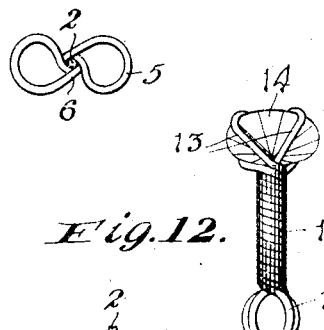
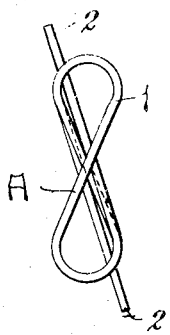
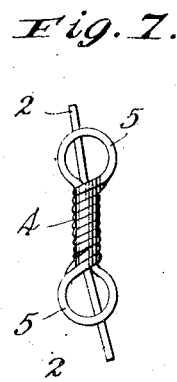
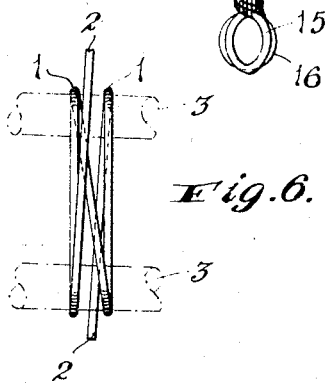
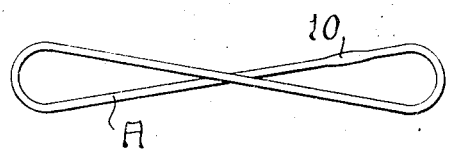
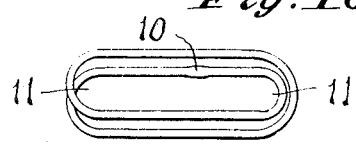

6. A fastener of the class described including a substantially straight twisted wire shank having a pair of wire loops at each end thereof, the loops of each of said pairs extending in opposite directions at an angle to said shank to form fastener terminals at opposite ends thereof.

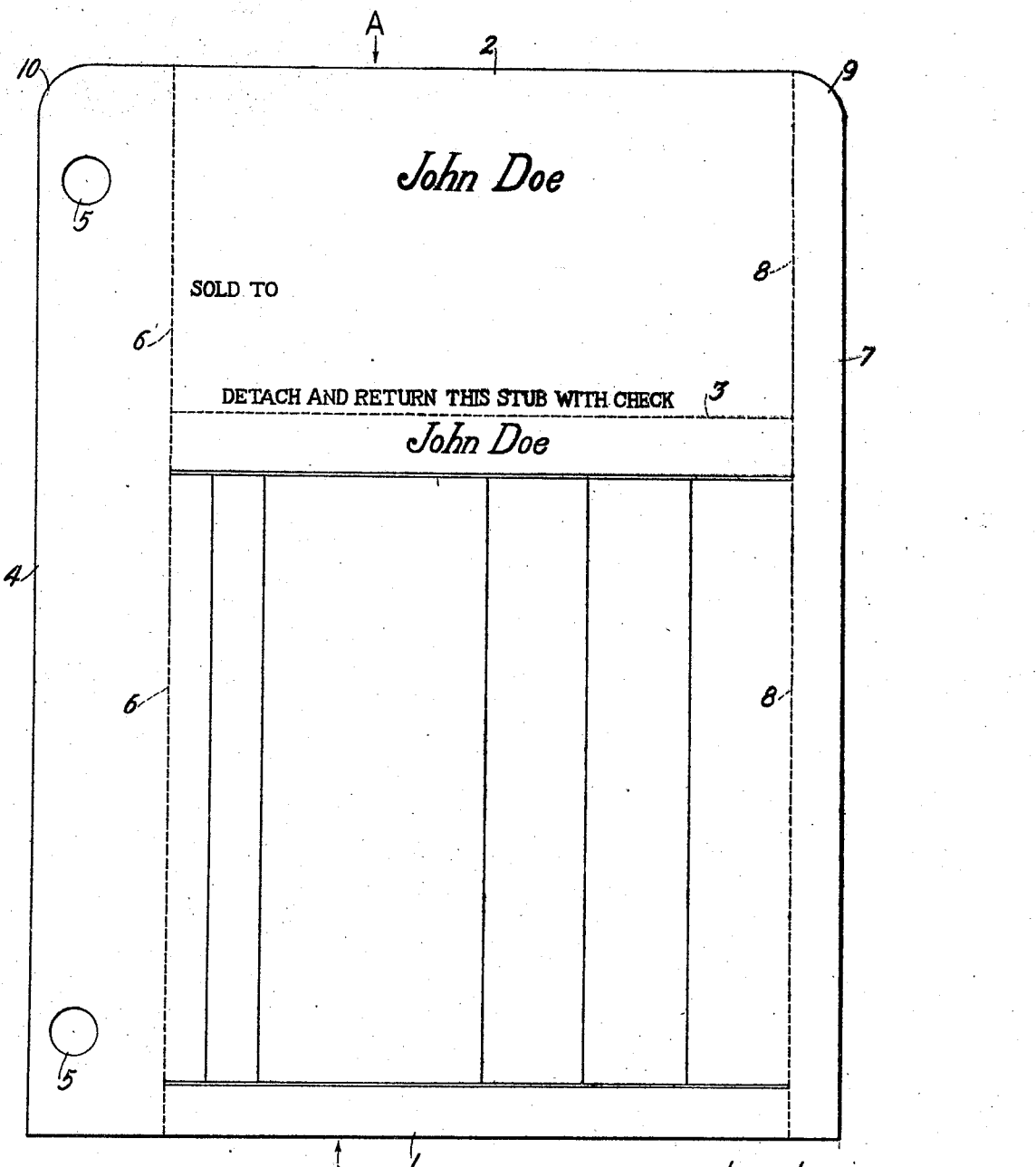

WOLF KAHN.